Figure 1:
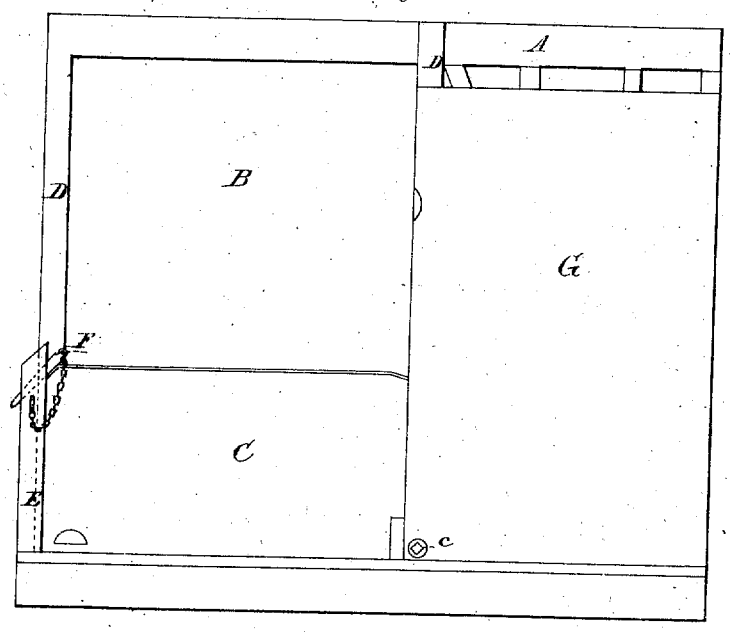

2 Sheets--Sheet 1.

J. BASSLER.

Doors for Grain Cars.

No. 5,157. Reissued Nov. 26, 1872.

Witnesses:
C. H. Poole.
John R. Young

Inventor:
John Bassler, by
Prindle and Roy his
Attorneys.

2 Sheets--Sheet 2.

J. BASSLER.

Doors for Grain Cars.

No. 5,157. Reissued Nov. 26, 1872.

Witnesses:

C. H. Poole.

John R. Young

Inventor:

John Bassler, by

Prindle and Lo. his attorneys.

UNITED STATES PATENT OFFICE.

JOHN BASSLER, OF GALESBURG, ILLINOIS.

IMPROVEMENT IN DOORS FOR GRAIN-CARS.

Specification forming part of Letters Patent No. 124,535, dated March 12, 1872; reissue No. 5,157, dated November 26, 1872.

*To all whom it may concern:*

Be it known that I, JOHN BASSLER, of Galesburg, in the county of Knox and State of Illinois, did obtain of and from the United States Letters Patent for certain Improvements in Doors for Grain-Cars, bearing date of March 12, 1872, and numbered 124,535, which Letters Patent have been found defective, in that the specification and claim do not cover and embrace all of the original invention and improvements as contained in the drawing and model filed in the Patent Office on the 7th day of December, 1871. Now, therefore, being desirous to reissue the same in the manner and form prescribed by law, I have prepared and do hereby declare that the following is a full, clear, and exact description of the said improvements, reference being had to the accompanying drawing making a part of this specification, in which—

Figure 4:
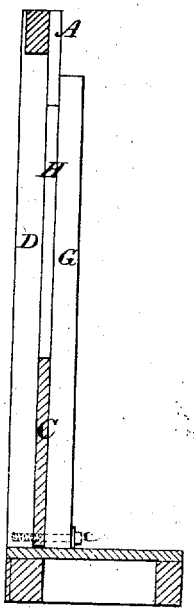
Figure 2:
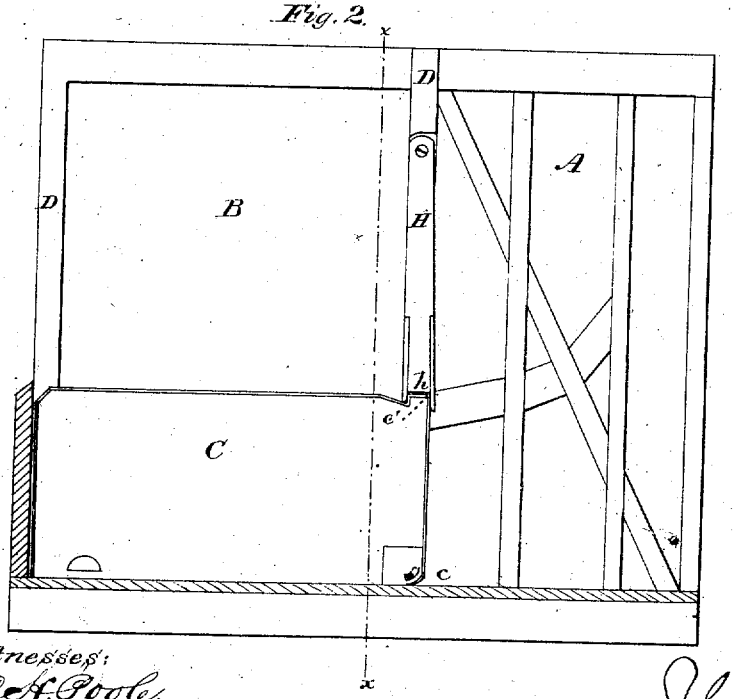
Figure 5:
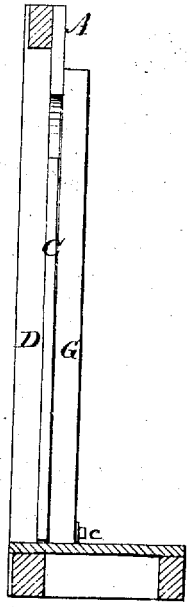
Figure 5:
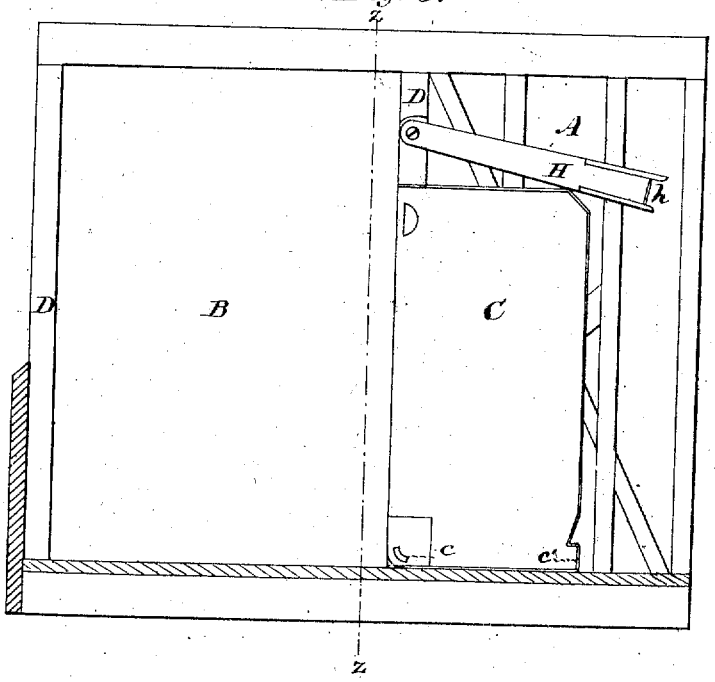
Figure 6:
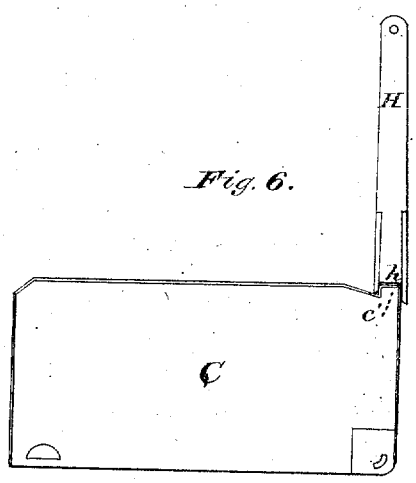

Figure 1 is an elevation of the inner face of a car side having its delivery-opening inclosed by means of the improved door; Fig. 2 is a like view of the same with the casing removed, so as to show the construction and arrangement of parts; Fig. 3 is a like view of said car side with said door turned away from the delivery-opening; Figs. 4 and 5 are vertical cross-sections on lines *xx* and *zz*, respectively, of Figs. 2 and 3; and Fig. 6 is a side elevation of the door and toggle-bar detached.

Letters of like name and kind refer to like parts in each of the figures.

As ordinarily constructed, the doors of grain-cars have been hinged or pivoted so as to open by swinging inward, by which means great difficulty has been experienced in unloading the cars, and it has been found impracticable to cause said doors to maintain a close joint between their lower edges and the car-floor, so as to prevent the grain from escaping between the same.

To obviate this and other objections is the design of my invention, which consists, principally, in the toggle-bar employed for inclosing the recess into which said door shuts, when said bar is constructed and combined with said door and the car side, substantially as and for the purpose hereinafter set forth. It consists, further, in the means employed for locking down the free end of the door, substantially as is hereinafter shown.

In the annexed drawing, A represents the side of a car provided with a discharge-opening, B, both of usual construction. The lower portion of the opening B is inclosed, when desired, by means of a door, C, which has a length somewhat greater than the width of said opening, and is pivoted at one of its lower corners to or upon the contiguous portion of a door-post, D, in such a manner as to permit it to be moved edgewise and in a vertical plane upon or around its pivotal bearing, *c*. As the pivotal bolt *c* is placed somewhat within the lines of the bottom edge and end of said door, the corner through which said bolt passes is cut away upon a circular line, of which said bolt is the center, so as to cause said corner to fit closely down upon the floor when said door is opened or shut. The forward end of the door, when closed, fits into a corresponding groove, which is provided within one edge of a cleat, E, that is secured upon the inner face of the contiguous door-post D, by which means the lateral position of said door is insured and the escape of grain between its end and said post prevented. In order that the vertical position of the free end of the door may be insured when closed, its upper forward corner is removed and a wedge-pin, F, placed diagonally across the same and through a corresponding opening within the cleat E, the relative positions of said opening and the corner of said door being such as to cause said wedge to firmly press the latter down upon or against the floor. When opened the door passes into a housing which is formed by sheathing up the inner side of the studs, which form the frame of the car side, and as said sheathing G extends to the roof, all of its forward side above the door will remain open, so as to render probable the entrance thereto of dirt and the consequent obstruction of said door. To remedy this difficulty, and also cause the rear pivoted end of the door to be firmly pressed against the floor, a bar, H, having a width corresponding to the width of the open front of the housing and a length somewhat less than the distance from the upper edge of said door to the roof, is pivoted at one end to or between the door-post D and the sheathing G, in such position as to cause its free end to swing downward against the upper rear corner of the door. The lower end of the bar H is shod with metal and provided with a notch, *h*, which extends laterally across the same in a line with the pivotal bearing and engages with a spur, *c'*, that is formed upon and extends upward from the rear upper corner of the door C. As thus arranged the bar H is pressed rearward and upward, as seen in Fig. 3, when the door is opened, but when the latter is closed the spur *c'* engages with the notched end of said bar and moves the same forward to a position directly over the pivotal bearing of said door and flush with the face of the door-post D, by which means a toggle-joint is formed of said parts, and by giving to said bar the necessary length any required degree of downward pressure may be exerted upon the rear end of the door so as to hold it firmly against the floor. In order that the necessary play may be allowed to the rear end of the door so as to render certain its bearing upon the floor without causing undue friction upon or wear of its pivotal bearing, the opening through which the bolt *c* passes is elongated upon a line concentric to the curved corner of said door, by which means the latter is allowed a certain degree of motion upon said bolt without removing said corner or its lower edge from contact with said floor.

The device is now complete, and its several parts operate together as follows: Upon removing the wedge-pin the forward end of the door is liberated, and may be turned upward and rearward until contained within the housing, such operation causing the toggle-bar to be released from engagement with the spur, and to be swung rearward and upward to the position shown in Fig. 3. Upon returning the door to its former position, the toggle-bar is brought into operation once more, and presses the rear end of the former so firmly against the floor as to not only close the joint between said parts, but also to prevent rattling and wear from the motion of the car. A like result is produced at the front end by the action of the wedge-pin.

Having thus fully set forth the nature and merits of my invention, what I claim as new is—

1. The pivoted toggle-bar H provided with the notch *h*, in combination with the pivoted edgewise-swinging door C provided with the spur *c'*, substantially as and for the purpose shown.

2. In combination with the pivoted edgewise-swinging door C and with the slotted door-post D, the wedge-pin F, passing into said post and bearing upon or against the upper forward corner of said door, substantially as and for the purpose set forth.

In testimony that I claim the foregoing I have hereunto set my hand this 23d day of September, 1872.

JOHN BASSLER.

Witnesses:
JOHN LASS,
A. C. NOTEWARE.